3,104,982
PROCESS FOR BONDING GYPSUM TO ALUMINUM
James H. Shanley, 562 6th Ave., Watervliet, N.Y.
No Drawing. Filed Apr. 27, 1960, Ser. No. 24,894
2 Claims. (Cl. 117—70)

This invention relates to the manufacture of gypsum wall panel and gypsum plank and has particular reference to a novel method of bonding gypsum plaster to thin sheet aluminum.

The object of this invention is to provide an attractive and durable surface for gypsum plaster, the metal surface also to serve as reinforcement for the gypsum. With the protection and reinforcement thus afforded by the metal surface gypsum panels can be used for exterior surfaces where ordinarily such exposure to the elements would prohibit the use of gypsum.

To accomplish these ends I have developed a process for bonding gypsum plaster to aluminum. Ordinarily gypsum plaster will not bond to aluminum since the surface of aluminum is too smooth to permit bonding by a cementitious material of this type. The process therefore is directed towards providing a rough surface which will make possible a good mechanical bond between gypsum and aluminum. This is accomplished by coating the aluminum with a thin film of hydraulic cement paste (preferably Portland) which will bond to the aluminum after it has been properly cured and will thus provide the rough surface to which the gypsum can be bonded. The process resulted from the discovery that the chemical action between any hydraulic cement containing lime, silica, and alumina causes a microscopic pitting of the aluminum, and that the cement will form a uniform bond if applied in a thin film and cured for about 24 hours. The corrosive action between hydraulic cement and aluminum has long been known; however, it is not feasible to bond the two materials together because if the cement is applied in quantity it will consume the aluminum and in the process a gas is given off which tends to disrupt and prevent any permanent bonding of the two materials. In my process this difficulty is overcome by applying the cement paste in a thin film, and by stopping the chemical action after 24 hours, and by switching to a different cementitious material (gypsum) which will bond to the cement film but not react chemically with the aluminum.

*Description of Process*

In practice I use commercially pure aluminum in sheets approximately 0.012 inch thick; however, other aluminum alloys of various thicknesses may be used. The side of the sheet on which the gypsum is to be applied is covered to a thickness of approximately 0.008 inch with a paste composed of one part Portland cement and one part water by volume. This coating can be applied by either brushing or spraying. The proportion of water and cement is not critical and can be varied to suit the method of application. After the paste has been applied it must be kept moist for a period of about 24 hours. Care must be taken to prevent drying out during this period since water is essential for the chemical action between cement and aluminum. The aluminum surface is then cleaned of all loose cement with a wire brush; and a slurry of gypsum plaster applied to the cleaned surface. Finally the gypsum slurry should be dried to remove all excess water.

Having thus described the invention, what is claimed as new is:

1. A process for bonding gypsum to aluminum which includes preparing the aluminum surface by coating the aluminum with a thin film of paste consisting essentially of hydraulic cement and water, curing the cement, applying a gypsum slurry on top of the cement coating, and drying the gypsum slurry.

2. A process for bonding gypsum to aluminum which includes preparing the aluminum surface by coating the aluminum with a thin film of paste consisting essentially of Portland cement and water, curing the cement paste for a period of approximately 24 hours, applying a gypsum slurry on top of the cement coating, and drying the gypsum slurry.

References Cited in the file of this patent

UNITED STATES PATENTS

| | | |
|---|---|---|
| 1,068,541 | Stewart | July 29, 1913 |
| 2,353,447 | Doherty | July 11, 1944 |
| 2,833,524 | Wolf | May 6, 1958 |
| 2,930,106 | Wrotnowski | Mar. 29, 1960 |
| 2,933,919 | Rueshoff | Apr. 26, 1960 |